(No Model.)
H. HILDE.
FORM OR MOLD FOR GLASS CIGAR MOLDS.
No. 321,498. Patented July 7, 1885.
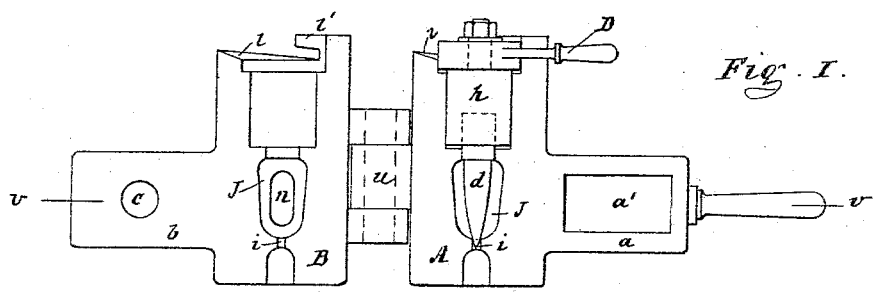
Fig. I.
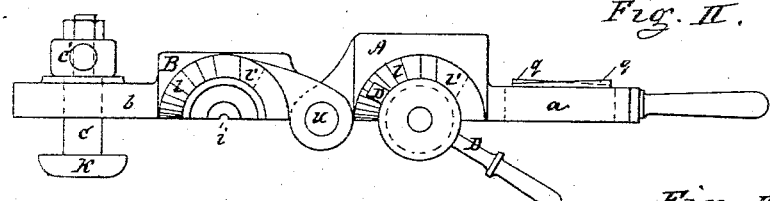
Fig. II.
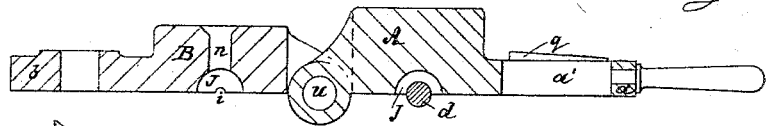
Fig. III.
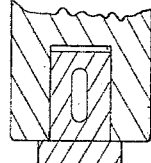
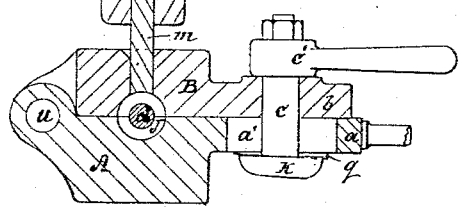
Fig. IV.
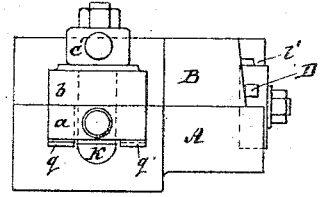
Fig. V.
WITNESS:
R. F. Cooke
Charles L. Green
INVENTOR
Hermann Hilde
BY
Henry E. Roeder
ATTORNEY

UNITED STATES PATENT OFFICE.

HERMANN HILDE, OF ROSSWEIN, GERMANY.

FORM OR MOLD FOR GLASS CIGAR-MOLDS.

SPECIFICATION forming part of Letters Patent No. 321,498, dated July 7, 1885.

Application filed October 30, 1884. (No model.)

*To all whom it may concern:*

Be it known that I, HERMANN HILDE, a citizen of Germany, residing at Rosswein, in the Empire of Germany, have invented a new and Improved Form or Mold for Glass Cigar-Molds, of which the following is a specification.

In the accompanying drawings, Figure I represents the form or mold open. Fig. II is a top view of the same. Fig. III is a section of the same at line $v\,v$, Fig. I. Fig. IV is a section of the same closed up. Fig. V shows an end view of the same.

Similar letters represent similar parts in all the figures.

The form or mold consists of two parts, A B, hinged together at $u$, and provided with two lugs, $a\,b$, on the opposite side of the hinge $u$. In the lug $b$ a bolt, $c$, is arranged, having an oblong head, K. The lug $a$ is provided with a large hole, $a'$, through which the head K can freely pass, and has at its back inclined surfaces $q\,q$, upon which the projecting parts of the head K when the bolt $c$ is turned works, and whereby the bolt is tightened and the parts A and B securely fastened together. The bolt $c$ is provided with a suitable handle, $c'$, to operate the same. In the parts A and B the necessary desired cavity, J, for the outside shape of the glass mold is made, one-half in each part. Through the part B a passage or opening, $n$, is made, communicating with the cavity J. Into the upper part of the parts A and B a plug, $h$, is fitted, provided with a lever, D, at its end, projecting on both sides of its hub and working upon an inclined surface, $l$, on top of the parts A and B, as well as into a corresponding projection, $l'$, whereby said plug $h$, after being inserted into the parts A and B, is securely fastened and held firmly in position by being turned partly around. Into the lower part of the plug $h$ a bolt or die, $d$, is fastened, of the desired shape of the inside of the glass mold. The end of this die can enter a small cavity, $i$, at the bottom of the cavity J, for the purpose of insuring its central position and in case the glass mold is desired to have an opening at its end. If no opening is desired at that end of the glass mold, this die $d$ must be made so much shorter and depend upon its central position on its fastening in the hub $h$. When the two parts A and B are closed and fastened together by means of their bolt $c$, and the plug $h$ is firmly secured into the same in the manner above described, the melted glass is poured into the mold through the opening $n$ until the cavity J is filled. The mold is then brought under a suitable press, the end of the plunger of which is provided with a plug, S, and die $m$ at its end, fitting exactly into the opening $n$, thereby compressing the glass in the cavity J and insuring a firm, compact, and solid surface around the central die, $d$. After this the finished glass mold is removed.

From the arrangement above described of closing and fastening the parts A and B, as well as the manner of securing the plug $h$ with die $d$ in position, it will be perceived that the operation of opening and closing the form and of inserting and removing the plug $h$ with die $d$ is performed with great facility and with very little loss of time.

The arrangement of subjecting the glass after the cavity has been filled to a pressure of a suitable press insures the perfect smooth surface on the inside around the die $d$, as well as the exact length desired of all the molds.

What I claim as my invention, and desire to secure by Letters Patent, is—

The herein-described form for making glass cigar-molds, consisting of the hinged parts A and B, secured together by a bolt, $c$, and containing the desired cavity, J, and opening $n$, the plug $h$, with die $d$, and lever D, working against inclines $l$ and projections $l'$, in combination with a suitable press-plunger provided with a plug, S, and die $m$, the whole being arranged to operate in the manner and for the purpose substantially as set forth.

In testimony whereof I have signed my name to this specification in the presence of two subscribing witnesses.

HERMANN HILDE.

Witnesses:
JACOB PIELE,
EDMUND BACH.